(12) United States Patent
Camm et al.

(10) Patent No.: US 10,987,658 B2
(45) Date of Patent: Apr. 27, 2021

(54) LOW WASHCOAT LOADING SINGLE LAYER CATALYSTS FOR GASOLINE EXHAUST GAS APPLICATIONS

(71) Applicant: Johnson Matthey Public Limited Company, London (GB)

(72) Inventors: Kenneth Camm, Wayne, PA (US); Hsiao-Lan Chang, Wayne, PA (US); Hai-Ying Chen, Wayne, PA (US); Michael Hales, Wayne, PA (US); Kwangmo Koo, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 219 days.

(21) Appl. No.: 16/136,852

(22) Filed: Sep. 20, 2018

(65) Prior Publication Data
US 2019/0091662 A1  Mar. 28, 2019

Related U.S. Application Data

(60) Provisional application No. 62/563,662, filed on Sep. 27, 2017.

(51) Int. Cl.
| | | |
|---|---|---|
| *B01J 23/63* | (2006.01) | |
| *B01D 53/94* | (2006.01) | |
| *B01J 21/04* | (2006.01) | |
| *B01J 37/02* | (2006.01) | |
| *F01N 3/10* | (2006.01) | |
| *B01J 37/00* | (2006.01) | |

(52) U.S. Cl.
CPC ............ *B01J 23/63* (2013.01); *B01D 53/945* (2013.01); *B01D 53/9477* (2013.01); *B01J 21/04* (2013.01); *B01J 37/0009* (2013.01); *B01J 37/0215* (2013.01); *F01N 3/101* (2013.01); *B01D 2255/1023* (2013.01); *B01D 2255/1025* (2013.01); *B01D 2255/2065* (2013.01); *B01D 2255/2092* (2013.01); *B01D 2255/20715* (2013.01); *B01D 2255/407* (2013.01); *B01D 2255/908* (2013.01); *B01D 2257/40* (2013.01); *B01D 2257/502* (2013.01); *B01D 2257/702* (2013.01); *B01D 2258/01* (2013.01); *B01D 2258/012* (2013.01); *B01J 37/0225* (2013.01); *B01J 2523/3712* (2013.01); *B01J 2523/48* (2013.01); *B01J 2523/822* (2013.01); *B01J 2523/824* (2013.01); *F01N 2370/02* (2013.01)

(58) Field of Classification Search
CPC ........ B01J 23/63; B01J 21/04; B01J 37/0009; B01J 37/0215; B01D 53/945; B01D 53/9477; F01N 3/101
See application file for complete search history.

(56) References Cited

U.S. PATENT DOCUMENTS

| | | | |
|---|---|---|---|
| 6,022,825 A | 2/2000 | Andersen | |
| 9,040,003 B2 | 5/2015 | Andersen | |
| 9,352,279 B2 | 5/2016 | Greenwell | |
| 2011/0252773 A1* | 10/2011 | Arnold | B01J 23/63 60/297 |
| 2014/0234189 A1 | 8/2014 | Clowes | |
| 2014/0369912 A1* | 12/2014 | Zheng | B01J 35/0013 423/213.5 |
| 2016/0228818 A1 | 8/2016 | Chang et al. | |

FOREIGN PATENT DOCUMENTS

EP  0304095 A3  5/1990

* cited by examiner

Primary Examiner — James A Fiorito

(57) ABSTRACT

A three-way catalyst article, and its use in an exhaust system for internal combustion engines, is disclosed. The catalyst article for treating exhaust gas comprising: a substrate; and a single catalyst layer deposited directly on the substrate; wherein the single catalyst layer comprises a first platinum group metal (PGM) component, an oxygen storage component (OSC) material, and an inorganic oxide; and wherein the single catalyst layer has a total washcoat loading of less than 2.4 g/in$^3$.

27 Claims, No Drawings

LOW WASHCOAT LOADING SINGLE LAYER CATALYSTS FOR GASOLINE EXHAUST GAS APPLICATIONS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is a three-way catalyst (TWC). TWCs perform three main functions: (1) oxidation of carbon monoxide (CO); (2) oxidation of unburnt hydrocarbons; and (3) reduction of $NO_x$ to $N_2$.

In most catalytic converters, the TWC is coated onto a high surface area substrate that can withstand high temperatures, such as flow-through honeycomb monoliths. The large surface area of these substrates facilitates the desired heterogeneous reactions, but can also contribute to exhaust backpressure, i.e., restrictions on the flow of exhaust gas from the engine to the tail pipe. High backpressure in an exhaust system can reduce the engine's fuel economy and power output. Despite advances in TWC technology such as those described in U.S. Pat. Nos. 6,022,825, 9,352,279, 9,040,003, and US Pat. Publication No. 2016/0228818, there remains a need for improved catalytic converters for certain engine platforms that simultaneously produce high conversion rates and low back pressure. This invention solves these needs amongst others.

SUMMARY OF THE INVENTION

One aspect of the present disclosure is directed to a catalyst article for treating exhaust gas comprising: a substrate; and a single catalyst layer deposited directly on the substrate; wherein the single catalyst layer comprises a first platinum group metal (PGM) component, an oxygen storage component (OSC) material, and an inorganic oxide; and wherein the single catalyst layer has a total washcoat loading of less than 2.4 g/in$^3$.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

The present invention is directed to the catalytic treatment of combustion exhaust gas, such as that produced by gasoline and other engines, and to related catalytic articles and systems. More specifically, the invention relates single-layered catalysts with low washcoat loadings. The catalysts can simultaneously treat $NO_x$, CO, and HC in a vehicular exhaust system. Surprisingly, the inventors have discovered that despite the low washcoat loading, the single layer catalyst of the present invention demonstrated high thermal durability while maintaining a high level of TWC performance. In addition, the catalyst of the present invention also showed reduced backpressure, which improves fuel economy and power outputs. In comparison with traditional higher washcoat loading and/or multi-layer catalyst formulations, the processes of the present invention also reduce the complexity.

One aspect of the present disclosure is directed to a catalyst article for treating exhaust gas comprising: a substrate; and a single catalyst layer deposited directly on the substrate; wherein the single catalyst layer comprises a first platinum group metal (PGM) component, an oxygen storage component (OSC) material, and an inorganic oxide; and wherein the single catalyst layer has a total washcoat loading of less than 2.4 g/in$^3$.

The first PGM is preferably selected from the group consisting of palladium, platinum, rhodium, and mixtures thereof. Particularly preferably, the first PGM is rhodium.

The single catalyst layer preferably comprises 0.05 to 2 weight percent of the first PGM, more preferably 0.06 to 0.6 weight percent of the first PGM, and most preferably 0.1 to 0.4 weight percent of the first PGM, based on the total weight of the single catalyst layer.

In the embodiments wherein the first PGM is rhodium, the single catalyst layer preferably comprises 0.05 to 2 weight percent of rhodium, more preferably 0.06 to 0.6 weight percent of rhodium, and most preferably 0.1 to 0.4 weight percent of rhodium, based on the total weight of the single catalyst layer.

The first PGM is generally in contact with the OSC material. Preferably the first PGM is supported on the OSC material. In addition to, or alternatively to, being in contact with the OSC material, the first PGM may be in contact with the inorganic oxide.

The OSC material is preferably selected from the group consisting of cerium oxide, a ceria-zirconia mixed oxide, and an alumina-ceria-zirconia mixed oxide. Preferably the OSC material is the ceria-zirconia mixed oxide. The ceria-zirconia mixed oxide can have a molar ratio of zirconia to ceria at least 50:50, preferably, higher than 60:40, more preferably, higher than 75:25.

The OSC material (e.g., ceria-zirconia mixed oxide) can be from 10 to 90% of total catalyst, preferably, 25-75%, more preferably, 35-65% in the single catalyst layer.

The inorganic oxide is preferably an oxide of Groups 2, 3, 4, 5, 13 and 14 elements. The inorganic oxide is preferably selected from the group consisting of alumina, lanthanide-stabilized alumina, alkaline earth stabilized alumina, silica, aluminosilicates, a magnesia/alumina composite oxide, titania, niobia, tantalum oxides, neodymium oxide, yttrium oxide, lanthanides, and mixed oxides or composite oxides thereof. Particularly preferably, the inorganic oxide is alumina, a lanthanide-stabilized alumina, or a magnesia/alumina composite oxide. One especially preferred inorganic oxide is alumina or a lanthanide-stabilized alumina.

The inorganic oxides preferably have a surface area in the range 10 to 1500 m$^2$/g, pore volumes in the range 0.1 to 4 mL/g, and pore diameters from about 10 to 1000 Angstroms. High surface area inorganic oxides having a surface area greater than 80 m$^2$/g are particularly preferred, e.g. high surface area alumina. Other preferred inorganic oxides include magnesia/alumina composite oxides, optionally further comprising a cerium-containing component, e.g. ceria. In such cases the ceria may be present on the surface of the magnesia/alumina composite oxide, e.g. as a coating.

The OSC material and the inorganic oxide can have a weight ratio of no greater than 10:1, preferably, no greater than 8:1 or 5:1, more preferably, no greater than 4:1 or 3:1, most preferably, no greater than 2:1.

Alternatively, the OSC material and the inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

The total washcoat loading of the single catalyst layer can be no greater than 2.0 $g/in^3$, preferably, no greater than 1.8 $g/in^3$ or 1.6 $g/in^3$; more preferably, no greater than 1.4 $g/in^3$ or 1.2 $g/in^3$; most preferably, no greater than 1.0 $g/in^3$.

The OSC material loading in the single catalyst layer can be less than 1.2 $g/in^3$. In some embodiments, the OSC material loading in the single catalyst layer is no greater than 1.0 $g/in^3$, 0.9 $g/in^3$, 0.8 $g/in^3$, 0.7 $g/in^3$, or 0.6 $g/in^3$.

The single catalyst layer may further comprise an alkali or alkali earth metal. In some embodiments, the alkali or alkali earth metal may be deposited on the OSC material. Alternatively, or in addition, the alkali or alkali earth metal may be deposited on the inorganic oxide. That is, in some embodiments, the alkali or alkali earth metal may be deposited on, i.e. present on, both the OSC material and the inorganic oxide.

The alkali or alkali earth metal is generally in contact with the inorganic oxide. Preferably the alkali or alkali earth metal is supported on the inorganic oxide. In addition to, or alternatively to, being in contact with the inorganic oxide, the alkali or alkali earth metal may be in contact with the OSC material.

The alkali or alkali earth metal is preferably barium or strontium. Preferably the barium, where present, is less than 1% by weight in the single catalyst layer. More preferably, the single catalyst layer is substantially free of the alkali or alkali earth metal, e.g., barium.

The single catalyst layer may further comprise a second PGM component.

The second PGM is preferably selected from the group consisting of palladium, platinum, rhodium, and a mixture thereof. Particularly preferably, the second PGM component is palladium if the first PGM component is rhodium.

In some embodiments, the rhodium component and the palladium component has a weight ratio of from 50:1 to 1:50. More preferably, the rhodium component and the palladium component has a weight ratio of from 10:1 to 1:10. Most preferably, the rhodium component and the palladium component has a weight ratio of from 5:1 to 1:5.

In certain embodiments, the single catalyst layer is essentially free of PGM metals other than the rhodium component.

The single catalyst layer of the invention may comprise further components that are known to the skilled person. For example, the compositions of the invention may further comprise at least one binder and/or at least one surfactant. Where a binder is present, dispersible alumina binders are preferred.

The substrate can be metal or ceramic substrate having an axial length L. Preferably the substrate is a flow-through monolith or a filter monolith, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 900. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the catalyst article comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard. For example, on the first face, the density of open first channels and closed second channels is from 100 to 900 channels per square inch.

In principle, the substrate may be any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the catalyst of the present invention comprises an electrical power connection, preferably at least two electrical power connections, more preferably only two electrical power connections. Each electrical power connection may be electrically connected to the electrically heatable substrate and an electrical power source. The catalyst of the present invention can be heated by Joule heating, where an electric current through a resistor converts electrical energy into heat energy.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

The catalysts of the invention may be prepared by any suitable means. For example, the catalyst may be prepared by mixing first PGM, an optional first alkali or alkali earth metal or second PGM, an inorganic oxide and an OSC material in any order. The manner and order of addition is not considered to be particularly critical. For example, each of the components of the catalyst may be added to any other component or components simultaneously, or may be added sequentially in any order. Each of the components of catalyst may be added to any other component of the catalyst by impregnation, adsorption, ion-exchange, incipient wetness, precipitation, or the like, or by any other means commonly known in the art.

Preferably, the catalyst as hereinbefore described is prepared by depositing the catalyst on the substrate using washcoat procedures. A representative process for preparing the catalyst using a washcoat procedure is set forth below. It will be understood that the process below can be varied according to different embodiments of the invention.

The washcoating is preferably performed by first slurrying finely divided particles of the components of the catalyst as hereinbefore defined in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers, binders, surfactants or promoters, may also be incorporated in the slurry as a mixture of water soluble or water-dispersible compounds or complexes.

The substrate may then be coated one or more times with the slurry such that there will be deposited on the substrate the desired loading of the catalyst.

It is preferred that the catalyst article of the present invention does not comprise any additional layer other than the single catalyst layer.

Another aspect of the present disclosure is directed to a method for treating a vehicular exhaust gas containing $NO_x$, CO, and HC using the catalyst article described herein. Catalytic converters equipped with TWC made according to this method show improved or comparable catalytic performance compared to conventional TWC, but also show more than 20% reduction in backpressure.

Another aspect of the present disclosure is directed to a system for treating vehicular exhaust gas comprising the catalyst article described herein in conjunction with a conduit for transferring the exhaust gas through the system.

The system can comprise a second catalyst article. Preferably, the second catalyst article can comprise a gasoline particulate filter (GPF) or a TWC. More preferably, the second catalyst article comprises a TWC catalyst.

The TWC catalyst can be any conventional TWC catalyst. For example, a conventional close-coupled TWC catalyst that normally contains higher catalyst washcoat loading and higher PGM content.

Preferably, the second catalyst article is upstream of the catalyst article. Alternatively, or in addition, the second catalyst article and the catalyst article are close-coupled.

Definitions

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as $\leq 5\%$ by weight, preferably $\leq 2\%$ by weight, more preferably $\leq 1\%$ by weight. The expression "substantially free of" embraces the expression "does not comprise."

The expression "essentially free of" as used herein with reference to a material, typically in the context of the content of a region, a layer or a zone, means that the material in a trace amount, such as $\leq 1\%$ by weight, preferably $\leq 0.5\%$ by weight, more preferably $\leq 0.1\%$ by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of g/ft$^3$ on a metal weight basis.

The following examples merely illustrate the invention. Those skilled in the art will recognize many variations that are within the spirit of the invention and scope of the claims.

EXAMPLES

Catalyst 1 (Comparative)

Catalyst 1 is a commercial three-way (Pd—Rh) catalyst with a double-layered structure. The bottom layer consists of Pd supported on a washcoat of a first CeZr mixed oxide, La-stabilized alumina, Ba promotor, and boehmite binder. The washcoat loading of the bottom layer was about 1.6 g/in$^3$ with a Pd loading of 1 g/ft$^3$. The top layer consists of Rh supported on a washcoat of a second CeZr mixed oxide, La-stabilized alumina. The washcoat lading of the top layer was about 1.4 g/in$^3$ with a Rh loading of 2 g/ft$^3$. The total catalyst loading of Catalyst 1 was about 3.0 g/in$^3$.

Catalyst 2

Catalyst 2 is a single-layered formulation, according to the present invention. Rh was mixed with a CeZr mixed oxide (molar ratio of Zr/Ce is 4.4:1). La-stabilized alumina was subsequently added to the above mixture. Once fully mixed, boehmite binder was added to form final washcoat. The slurry was coated on monolithic substrates, which was dried at 100° C. and calcined at 500° C. for 30 mins. The washcoat lading was about 1.0 g/in$^3$ (0.6 g/in$^3$ CeZr mixed oxide and 0.4 g/in$^3$ alumina) with a Rh loading of 3 g/ft$^3$.

Experimental Results

Catalyst 1 and Catalyst 2, coated on the same substrate type, cpsi and dimensions were evaluated for Cold Flow Backpressure at a flow rate of 300 m$^3$/h. In addition, Comparative Catalyst 1 and Catalyst 2 were aged using a gasoline engine under standard lean, rich, stoichiometric cycling TWC aging conditions. They were performance tested for light off temperature and air/fuel ratio performance response (450° C.) on a gasoline engine.

Example 1

The percentage increase in backpressure over the bare substrate for Catalyst 1 and Catalyst 2 are shown in Table 1. This data indicates that the low washcoat loading single layer technology of Catalyst 2 has significantly lower contribution to backpressure than the standard two layer, high washcoat loading example of Catalyst 1.

TABLE 1

Catalyst Cold Flow Backpressure Test Results

| | Backpressure (% increase over bare substrate) | |
|---|---|---|
| Flow Rate (m$^3$/h) | Catalyst 1 | Catalyst 2 |
| 300 | 40 | 11 |

Example 2

The HC, CO and NO$_x$ T$_{50}$ light off temperatures of Catalyst 1 and Catalyst 2 are shown in Table 2. This data indicates that, surprisingly, the low washcoat loading single layer technology of Catalyst 2 gives equivalent performance to the standard two layer, high washcoat loading example of Catalyst 1.

TABLE 2

Engine Bench Light Off Test Results

| Pollutant | T$_{50}$ (° C.) Catalyst 1 | T$_{50}$ (° C.) Catalyst 2 |
|---|---|---|
| HC | 363 | 362 |
| CO | 356 | 354 |
| NO$_x$ | 357 | 356 |

Example 3

The HC, CO and NO$_x$ Conversion performance at the cross-over point of the AFR testing is shown in Table 3. The data indicates that, surprisingly, the low washcoat loading single layer technology of Catalyst 2 gives equivalent performance to the standard two layer, high washcoat loading example of Catalyst 1.

TABLE 3

Engine Bench AFR Ratio Performance Test Results

| Pollutant | Cross Over Point Conversion (%) Catalyst 1 | Cross Over Point Conversion (%) Catalyst 2 |
|---|---|---|
| HC | 86 | 86 |
| CO/NO$_x$ | 98 | 98 |

We claim:

1. A catalyst article for treating exhaust gas comprising:
a substrate; and
a single catalyst layer deposited directly on the substrate;
wherein the single catalyst layer comprises a first platinum group metal (PGM) component, an oxygen storage component (OSC) material, and an inorganic oxide;
wherein the single catalyst layer has a total washcoat loading of no greater than 1.4 g/in$^3$;
wherein the OSC material loading in the single catalyst layer is less than 1.2 g/in$^3$; and
wherein the substrate is a flow-through monolith.

2. The catalyst article of claim 1, wherein the total washcoat loading of the single catalyst layer is no greater than 1.2 g/in$^3$.

3. The catalyst article of claim 1, wherein the first PGM component is selected from the group consisting of platinum, palladium, rhodium, and a mixture thereof.

4. The catalyst article of claim 1, wherein the first PGM component is rhodium.

5. The catalyst article of claim 4, wherein the rhodium loading is ranged from 0.05-2 wt. %, based on the total weight of the single catalyst layer.

6. The catalyst article of claim 1, wherein the OSC material loading in the single catalyst layer is no greater than 1.0 g/in$^3$.

7. The catalyst article of claim 1, wherein the OSC material is selected from the group consisting of cerium oxide, a ceria-zirconia mixed oxide, and an alumina-ceria-zirconia mixed oxide.

8. The catalyst article of claim 7, wherein the OSC material is the ceria-zirconia mixed oxide.

9. The catalyst article of claim 8, wherein the ceria-zirconia mixed oxide has a molar ratio of zirconia to ceria at least 1:1.

10. The catalyst article of claim 1, wherein the inorganic oxide is selected from the group consisting of alumina, lanthanide-stabilized alumina, alkaline earth stabilized alumina, silica, aluminosilicates, a magnesia/alumina composite oxide, titania, niobia, tantalum oxides, neodymium oxide, yttrium oxide, lanthanides, and mixed oxides or composite oxides thereof.

11. The catalyst article of claim 10, wherein the inorganic oxide is alumina, a lanthanide-stabilized alumina, or a magnesia/alumina composite oxide.

12. The catalyst article of claim 1, wherein the OSC material and the inorganic oxide has a weight ratio of no greater than 10:1.

13. The catalyst article of claim 1, wherein the single catalyst layer further comprises a second PGM component.

14. The catalyst article of claim 13, wherein the second PGM component is selected from the group consisting of platinum, palladium, rhodium, and a mixture thereof.

15. The catalyst article of claim 14, wherein the first PGM component is rhodium and the second PGM component is palladium.

16. The catalyst article of claim 15, wherein the rhodium component and the palladium component have a weight ratio of from 10:1 to 1:10.

17. The catalyst article of claim 4, wherein the single catalyst layer is essentially free of PGM metals other than the rhodium component.

18. The catalyst article of claim 1, wherein the catalyst article does not further comprise any additional layer.

19. An emission treatment system for treating a flow of a combustion exhaust gas comprising the catalyst article of claim 1.

20. The emission treatment system of claim 19, further comprises a second catalyst article.

21. The emission treatment system of claim 20, wherein the second catalyst article comprises a TWC catalyst.

22. The emission treatment system of claim 20, wherein the second catalyst article is upstream of the catalyst article.

23. The emission treatment system of claim 20, wherein the second catalyst article and the catalyst article are close-coupled.

24. A method of treating an exhaust gas from an internal combustion engine comprising contacting the exhaust gas with the catalyst article of claim 1.

25. A method of treating an exhaust gas from an internal combustion engine comprising contacting the exhaust gas with the emission treatment system of claim 19.

26. The catalyst article of claim 1, wherein the total washcoat loading of the single catalyst layer is no greater than 1.0 g/in$^3$.

27. The catalyst article of claim 1, wherein the OSC material loading in the single catalyst layer is no greater than 0.8 g/in$^3$.

* * * * *